United States Patent [19]

Dixon et al.

[11] Patent Number: 5,175,822

[45] Date of Patent: Dec. 29, 1992

[54] APPARATUS AND METHOD FOR ASSIGNING ADDRESSES TO SCSI SUPPORTED PERIPHERAL DEVICES

[75] Inventors: Jerry D. Dixon; Don S. Keener; Howard J. Locker; Gerald A. Marazas, all of Boca Raton; Andrew B. McNeill, Deerfield Beach; Thomas H. Newsom, Boca Raton; Neal A. Osborn, Delray Beach, all of Fla.

[73] Assignee: International Business Machines Corporation, Armonk, N.Y.

[21] Appl. No.: 368,679

[22] Filed: Jun. 19, 1989

[51] Int. Cl.⁵ .................... G06F 15/16; G06F 13/22
[52] U.S. Cl. .................... 395/275; 364/240.1; 364/942
[58] Field of Search ............. 364/200, 900; 395/275

[56] References Cited

U.S. PATENT DOCUMENTS

| | | | |
|---|---|---|---|
| 4,156,277 | 5/1979 | Seitz et al. | 364/200 |
| 4,360,870 | 11/1982 | McVey | 364/200 |
| 4,373,181 | 2/1983 | Chisholm et al. | 364/200 |
| 4,660,141 | 4/1987 | Ceccon et al. | 364/200 |
| 4,727,475 | 2/1988 | Kiremidjian | 364/200 |
| 4,773,005 | 9/1988 | Sullivan | 364/200 |
| 4,821,170 | 4/1989 | Bernier et al. | 364/200 |

Primary Examiner—Robert L. Richardson
Assistant Examiner—Robert S. Hauser
Attorney, Agent, or Firm—George E. Grosser

[57] ABSTRACT

Apparatus for assigning addresses to devices connected to a small computer system interface (SCSI) bus. A second configure bus interconnects address assignable devices on the SCSI bus. The assignable devices may be used in a mixed system where some devices have fixed non-assignable addresses. The master device in the SCSI bus transmits configuration commands over the configuration bus and addresses for assignment over the SCSI bus. Acknowledgements are received back from a device which has accepted an address. Once configured with an address, the device propagates subsequent configuration commands to an adjacent device.

9 Claims, 3 Drawing Sheets

APPARATUS AND METHOD FOR ASSIGNING ADDRESSES TO SCSI SUPPORTED PERIPHERAL DEVICES

BACKGROUND

The present invention relates to address assignable modular devices which can be inserted into an existing bus structure. Specifically, the invention is directed to devices in the Small Computer System Interface (SCSI) environment.

Devices which communicate over a data bus are well known. Techniques for assigning addresses for each of the communicating devices is described, for example, in U.S. Pat. No. 4,360,870, and a related IBM TDB, Vol. 22, No. 3, Aug. 1979, pages 882-883. The apparatus described in these references has the capability of assigning addresses to a device configured on a data bus.

The SCSI environment has requirements which are not satisfied by the address assignment techniques described in these references. Specifically, the techniques of the prior art assume that assignable address space is completely under control of the particular device performing the address assignment function. In the SCSI environment, some devices conceivably will have hardwired, fixed and therefore unchangeable addresses. Any device performing address assignment must first take into account the presence of any devices having fixed addresses and exclude these fixed addresses from the inventory of assignable addresses. There is the necessity to identify the presence of such devices having fixed addresses before configuring additional devices which may have the feature of address assignability.

A further problem in the SCSI bus environment is that the device performing address assignment may precede or follow the devices which are to receive address assignments. The SCSI bus is a two-dimensional structure and the random nature of the location of the address assigning device requires that a capability must be provided for addressing in either of the two directions in which the bus runs, so that later-added devices, as well as previously supplied devices may be address configured.

Given this environment, it would therefore be advantageous to provide a device which can assign addresses in either of the two directions in which the SCSI bus runs. It would be necessary to permit pre-existing devices, which do not have an address assignment capability, to remain on the bus and their presence accounted for during any subsequent assignment of addresses. A method must be provided for quickly determining the presence of devices having non-assignable addresses and that the remaining devices be quickly assigned addresses distinct from the fixed address devices.

Finally, it is necessary to maintain the bus overhead requirements to a minimum so that cabling and IC substrate overhead are maintained at a minimum.

SUMMARY OF THE INVENTION

It is an object of this invention to provide a method and apparatus for address assignment to devices connected to an SCSI bus.

It is a more specific object of the invention to provide an apparatus and method for mapping the address identity of fixed address devices on an SCSI bus and subsequently assigning other addresses to other address assignable devices on the SCSI bus.

These and other objects are provided by a second or configuration bus interconnecting a plurality of address assignable SCSI interfaces. The second bus adds a minimum of cabling requirements, but provides an ability to configure each of the new SCSI interfaces with an appropriate address assigned electronically.

In carrying out the invention, one of the SCSI interfaces serves as a master interface device, capable of transmitting assignment commands in two directions. The remaining interconnected SCSI devices respond to configuration commands utilizing a unique configuration protocol. Each connected device may have a physical identification which is provided by a hardwired or mechanical switch which is defaulted to under an error condition.

The system may include a second master interface having a lower priority which, during a configuration routine, contends with the first master interface for access to the SCSI bus. In the event the first master interface is disabled, the second master interface will gain access to the SCSI bus and carry out the configuration.

The invention provides for the use of additional address assignable interfaces in a system where devices having fixed addresses are used. The master interface device, during the initial phase of configuration, will map the addresses of devices which cannot be assigned addresses.

The master interface configuration routine in a preferred embodiment of the invention will transmit configuration commands over the configuration bus to each of the configurable devices, programming in sequence the interconnected devices. The first of the interconnected devices receives a configuration command on the configuration bus, and an assigned address on the SCSI bus. The interconnected device will accept the command and issue a CONFIRM or REJECT acknowledgement over the configuration bus. Subsequent configuration commands are passed on to subsequent devices until all assignable interface devices are configured with appropriate addresses.

DETAILED DESCRIPTION OF THE INVENTION

Figure 1:
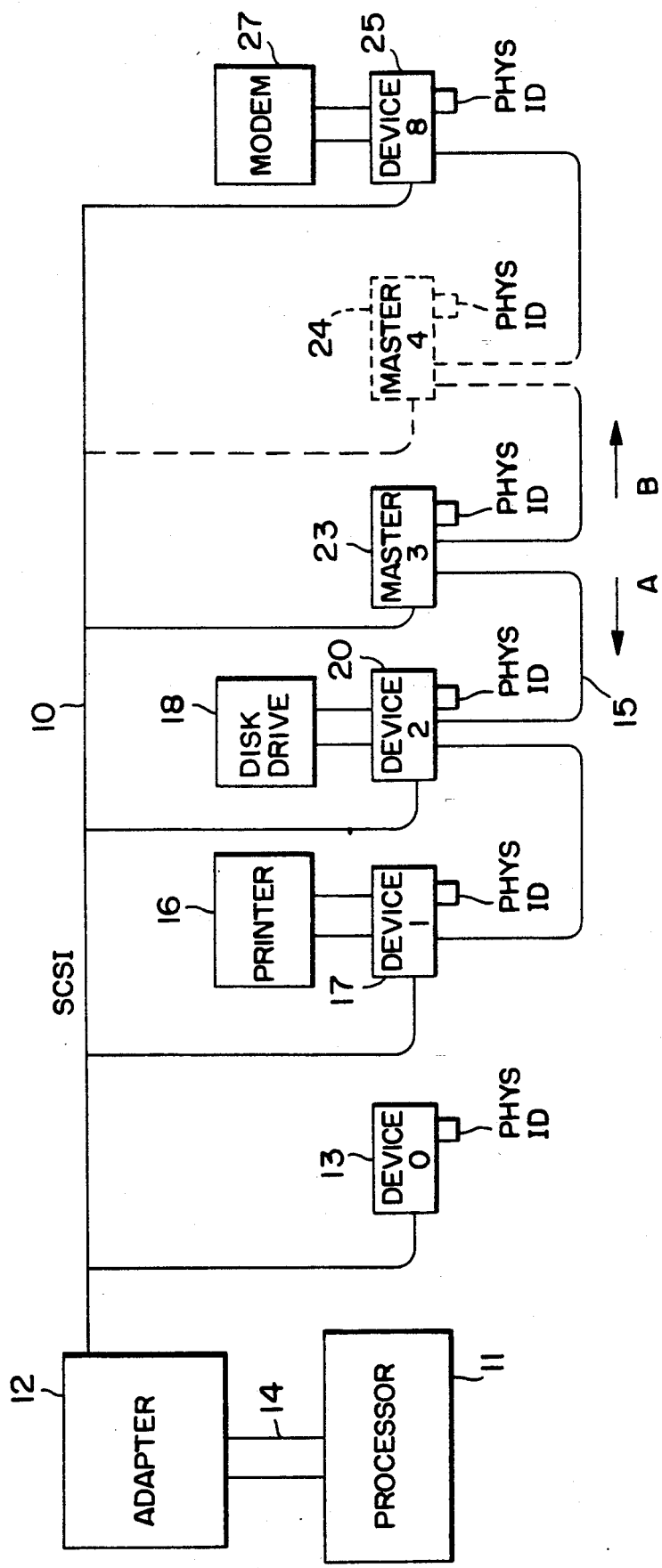
FIG. 1 illustrates the use of an SCSI bus 10 for connecting peripheral devices to a central processor.

Referring now to FIG. 1, there is illustrated a processor 11 which communicates through an adapter 12 to a conventional SCSI bus 10. The SCSI bus permits data transfer to/from any of the connected peripheral devices over four data lines to/from the adapter 12 and processor 11. Typically, devices 13 are connected to the SCSI bus 10 and are identified by an address which is physically implemented in the device 13. The adapter/device 13 has a physical address identified by either rocker switches located in the device, or by a suitable connected jumper connection programming a four-digit binary address for the device 13.

It is accordingly an object of the present invention to provide for address assignability to devices which are later added to the SCSI bus 10. Devices 17, 20, 23 and 24 are shown which include a physical ID and which are capable of receiving an assigned address which overrides the physical ID. In the absence of an assigned address, the physical ID is used to identify the device for any commands appearing on the SCSI bus.

In order to program addresses in each of the address assignable devices 17, 20, 23 and 25, a second or configuration bus 15 is shown. The configuration bus is connected from a master adapter/device 23 which can propagate address assignments in both directions A and B. Thus, as shown in FIG. 1, the time at which a particular master is added (or the order in which devices are added) to the SCSI environment, or its relative placement vis a vis other address assignable devices, is not important to the operation of the device.

Each of the assignable devices 17, 20, 23 and 25 are shown connected to printers 16, disk drive 18 and modem 27, illustrating the versatility of using the SCSI bus to enlarge the system encompassed by the processor 11 and adapter 12.

Figure 3:
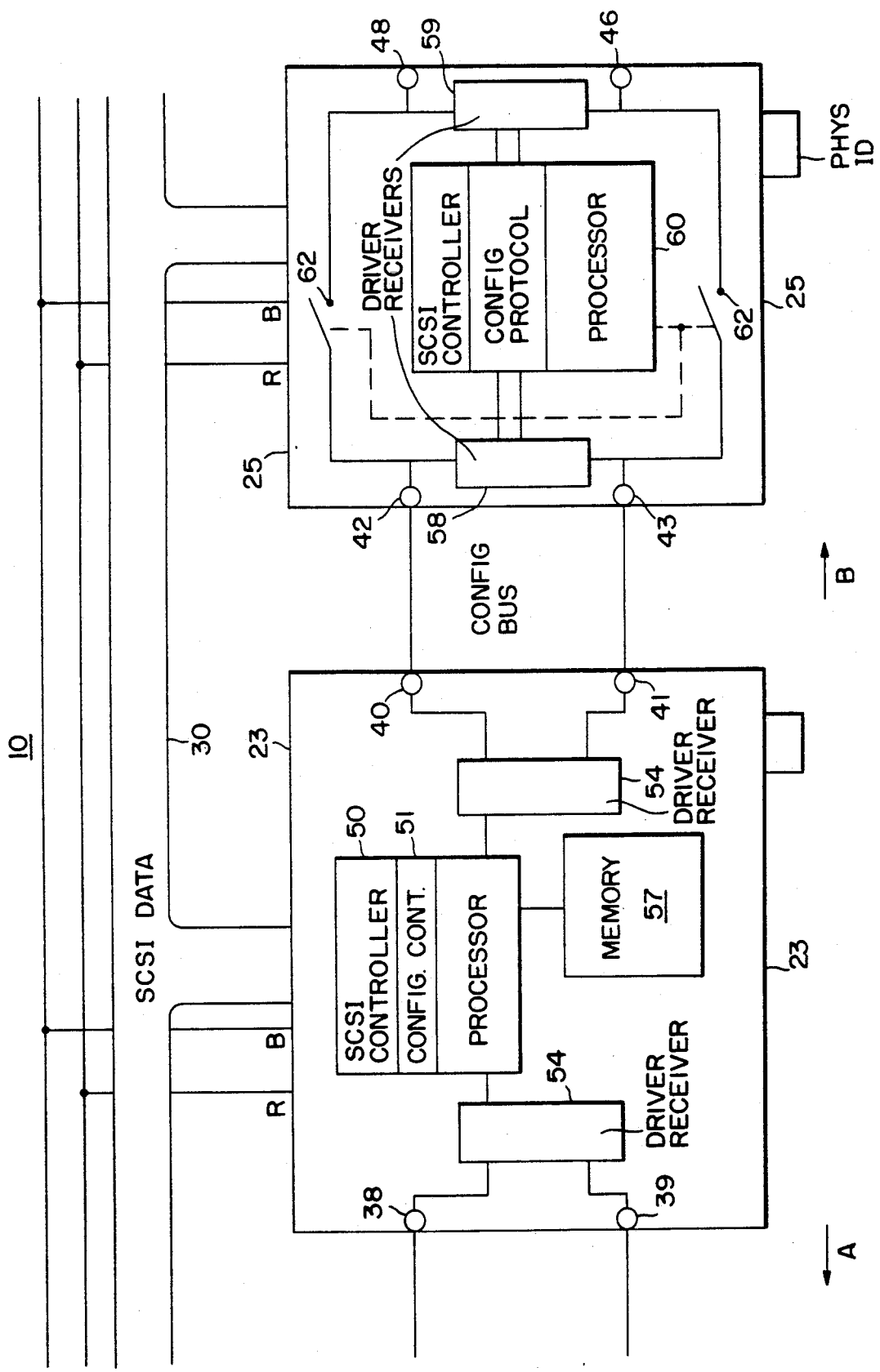
FIG. 3 illustrates the architecture of each interface device which serves as a master for assigning data, as well as the architecture for devices which are address assignable.

The addition of a configuration bus 15 and a master interface device 23 permits the master device 23 to assign addresses to all the interconnected address assignable devices. The address flow during a configuration state is from the master to its nearest adjacent member. The master 3 includes a processor, as will be clear when FIG. 3 is discussed in detail. During a configuration routine, the processor of the master device 23 will assign configuration commands to one of two outputs, permitting units interconnected to the output to receive address assignments. While shown separately in FIG. 1, in practice the configuration bus 15 is included as part of the cabling available in the overall SCSI cabling structure. The additional conductors necessary to establish the configuration bus 15 are kept to a minimum, and may be as few as four wherein a single pair is used per digit. The normal or conventional 50-lead SCSI bus includes 8 bits of data and command and protocol functions. Of course, it is possible to implement a configuration bus on either a single ended or a differential SCSI environment if the additional conductors are provided. Each of the external devices 16, 18 and 27 are individually powered from a source outside the SCSI structure. This has a system constraint in that the devices are individually powered and therefore not under control of the system designer.

Figure 2:
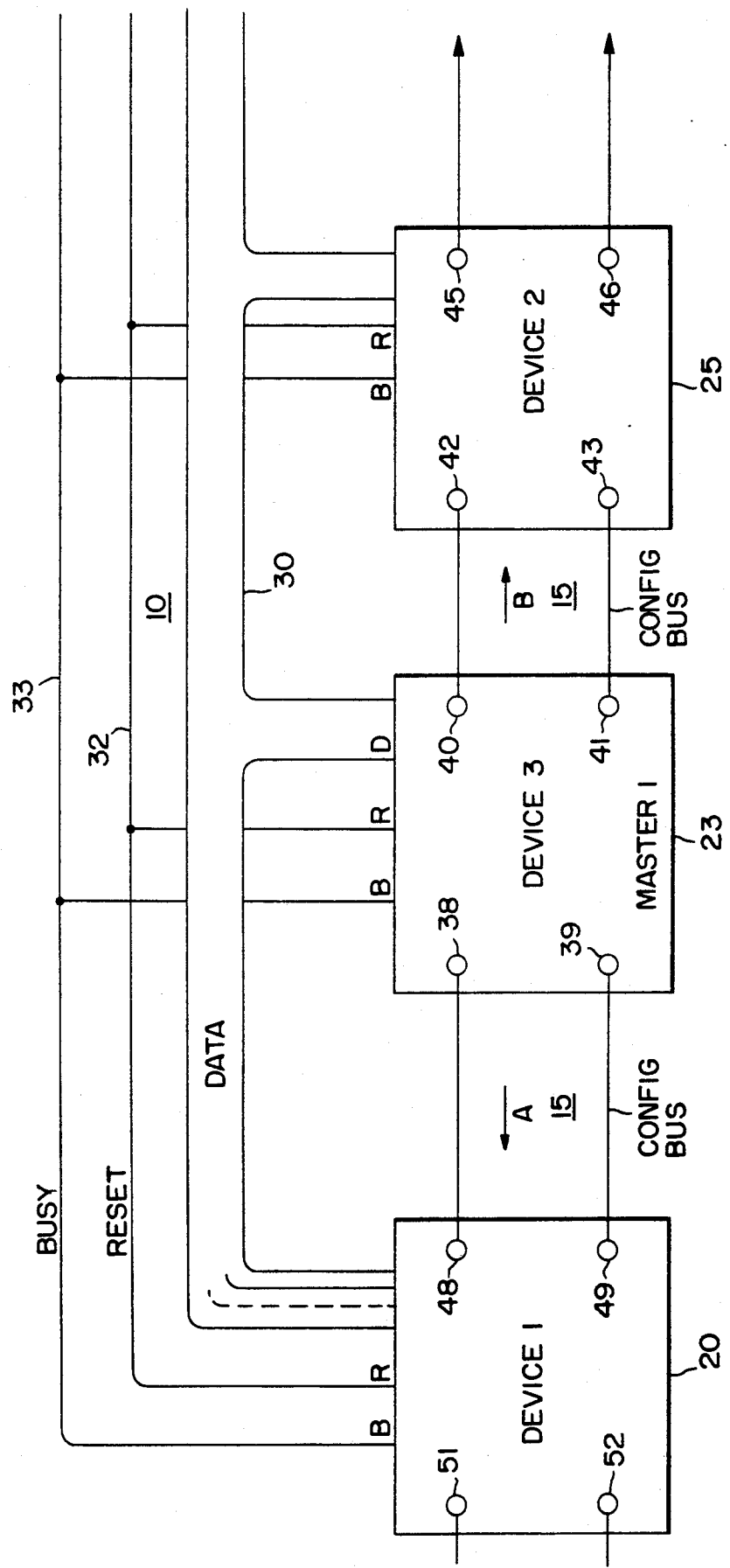
FIG. 2 illustrates a connection of the configuration bus between devices for assigning addresses to each device.

Referring now to FIG. 2, there is shown the required interconnection between address assignable devices and a master interface device 23. Shown in this Figure is the configuration bus 15 in a single ended implementation. The address assignable devices 20 and 25 are shown to have four terminals, 48, 49, 51 and 52, and 42, 43, 45 and 46. These four terminals illustrate that the device is assignable from either of two directions, depending on the position of the master device 23, which transmits the configuration command for an address assignment to each of the connected address assignable devices. The individual devices 20 and 25 are interface adapters which include a microprocessor for handling all protocol functions with the SCSI bus 10. The SCSI bus 10 is shown, including a set of four data conductors 30, a reset conductor 32 and busy conductor 33. Once a device 20 or 25 has received an address assignment in a configuration routine to be described more completely, it will then propagate subsequent commands received once the configuration bus to a remaining pair of output terminals 45 and 46 (in the case of device 25), and 51 and 52 (in the case of device 20). These output leads are designated during a phase of the configuration routine, wherein each device senses which of its pair of terminals are receiving command data, designating the remaining pair of terminals as output terminals. Thus, it can be seen that during address assignment, the master unit 23 can propagate commands in either of the two directions A and B, and when an adjacent device is configured with an assignment, subsequent assignment commands are forwarded via the configuration bus to remaining chained address assignable devices.

There is additionally shown the reset conductor 32 which is activated just prior to an assignment sequence. The master device 23 will assert the reset, thus wiping out any previous address assignment in all address assignable devices. The reset conductor 32 is added to the prior art SCSI bus.

During an address assignment, the busy conductor 23 is asserted by the master device, thus prohibiting any of the connected address assignable devices from participating in any data communications over the SCSI bus. Assertion of BUSY will also prevent the SCSI devices from attempting to obtain use of the bus. The master device 23 will assert its priority status during the configuration routine until all assignments are made to each of the connected devices. The connected devices all have a physical ID as well, which, in the absence of an assignment of an address, can be used as a default address. The physical ID must be unique to each device to avoid any multiple device responses from addresses originating from the host processor 11. In the event a device is added to the SCSI bus having a physical address which is not unique, and the device defaults to its physical address, an error will occur frm which the system cannot recover.

Each of the configuration bus lines are shown to be single conductors, connecting terminals 38 to 48, 39 to 49 and likewise, 40 to 42 and 41 to 43. It is understood there is a ground conductor accompanying each of the connected lines, permitting a binary bit to be transmitted on each of the conductor lines.

The address configuration routine can be described in terms of the following six states, as shown in Table I:

TABLE I

| State Name | Reset | Busy | In 1 | In 2 | Data Bus |
|---|---|---|---|---|---|
| Enable Config. Process | 1 | 1 | 1 | 1 | ID of Master |
| Address Assignment | 0 | 1 | 1 | 1 | ID Sent by Master |
| Confirm Accept | 0 | 1 | 0 | 1 | ID Accepted |
| Confirm Rejected | 0 | 1 | 1 | 0 | Current ID of Device |
| Neutral State | 0 | 1 | 0 | 0 | No Data |
| Error State | 0 | 0 | 1 | 1 | Not Driven |

The first of these states is the enable configuration process. A RESET and BUSY condition are set on BUSY and RESET conductors 32 and 33 by the master device 23. The master device will begin to configure in direction A, and when all devices in this direction with respect to the master device 23 are so configured, begin a configuration routine in the opposite direction B. The terminals 38 and 39 are shown during the ENABLE portion of the routine as including binary 1,1. At the same time, the master device will assert on the SCSI data bus 30 the identity of the master.

Having thus reset each of the address assignable devices 1, so that they are ready to receive a new address, the address assignment state is entered. BUSY is still maintained at a logic 1 (asserted) condition, as well as the two input bits 38 and 39. The device 20 will recognize the presence of bits 1,1 on terminals 48 and 49. The device 1 will configure terminals 51 and 52 as output terminals, while receiving data bits 1,1 on terminals 48 and 49. The new address assignment is sent by the master 23 over the SCSI data bus 30 in a bit position format.

If the device 20 has accepted the address sent by the master over SCSI bus 30, it will issue a CONFIRM/ACCEPT command, indicated as binary 0,1 on terminals 48 and 49. In the event the address has not been accepted as either not having correct parity or within a value identified by the device as valid, a CONFIRM/REJECT is issued by binary 1,0, asserted on terminals 48 and 49 of the configuration bus. An error state occurs when either the BUSY is released and binary 1,1 is asserted on terminals 48 and 49, or a neutral state is determined when terminals 48 and 49 have a 0,0 state after acceptance of the address assignment.

The system of FIG. 1 is shown to include an alternate master 24. The alternate master is included to provide some redundancy in the event the primary master 23 is not able to perform its configuration function. The master device 23 has a physical ID which has a higher priority than the physical ID of the alternate master device 24. During the foregoing ENABLE configuration process, both master devices 23 and 24 may compete for access to the SCSI bus 10, using standard contention techniques employed on the SCSI bus structure. The higher priority master device 23 will normally gain access to the SCSI bus and proceed with the ENABLE configuration process of Table I. In the event the master device 23 is inoperative, the alternate master device 24 will obtain access to the SCSI bus 10. It should be noted that only one master can make address assignments. Should two masters attempt to assign addresses, an error will occur from which the SCSI system cannot recover.

The device receiving a configuration command on the configuration bus will accept the valid address on the SCSI data bus 30. An error state will be declared, and a CONFIRM/REJECT sent if two or more bits are detected on the SCSI data bus. This obviously violates the bit position format for the address assignment. Additional error states are declared if an address assignment signal is asserted on both pairs of terminals for the devices.

For additional protection, the device receiving address assignment will not emit a CONFIRM/ACCEPT signal unless there has been a neutral state on the input pair following an address assignment command. As an optional measure, the device receiving an address assignment may assert its new address on the SCSI data bus 30, following configuration, during a CONFIRM/ACCEPT command, thus providing the master 23 with a further check on its address assignments. The master may subsequently declare an error state if the wrong ID has been placed on the SCSI data bus 30, also in bit position format.

Following the successful assignment of an address, the device so configured will set an internal configuration switch (shown in FIG. 3) to propagate any subsequent commands received on terminals 48 and 49 to terminals 51 and 52. The master device 23 may subsequently transmit further configuration commands and address assignments to additionally connected devices.

In the event that a CONFIRM/REJECT signal is transmitted, the master 23 will to terminate a configuration sequence. The BUSY will be deasserted on the SCSI bus, and the master will post a CONFIGURATION ERROR over both its configuration pairs.

Once the master has configured devices in one of the directions A or B, it will observe no further confirmation signals coming back from that direction. The master then ends the address assignment in the given direction, and begins assignment in the other direction B.

The foregoing system may be implemented as shown in FIG. 1 along with devices which have only physical IDs. The configuration routine is executed by the master immediately upon power up of the master. Alternatively, if the processor asserts the reset conductor 32, the master will begin a configuration routine. The master device as part of a configuration routine, can initially poll the SCSI bus 10 for any devices which have a physical ID associated therewith. In this case, the reset line is asserted which resets the address register of devices which are address assignable. The master 23 may then poll for devices on the SCSI bus and prepare a map of addresses for which a response is received. This will identify the devices which only have physical addresses, and are not address assignable. The master can build a logical map in memory storage, identifying all those addresses which are dedicated to the non-configurable devices on the SCSI bus. Thus, the master will not attempt to assign addresses which conflict with device addresses which are non-configurable.

Returning now to FIG. 3, there is shown a more detailed architectural organization of each configurable device 25, and the master device 23. The master device 23 includes a processor, organized to have an SCSI controller 50, and configuration controller 51. The SCSI controller provides normal protocol and interface with the conventional SCSI bus structure 10. A configuration controller is also included in the processor to effect the protocol shown in Table I.

The master device 23 includes a driver/receiver 54 connected to each pair of terminals 38 and 39, and 40 and 41. The driver/receiver 54 will apply the various commands in the configuration of Table I to the respective terminals 40 and 41 and 38 and 39 to configure devices lying in each of the configuration directions A or B. Initially, the SCSI controller 50 will, prior to configuration, assert the reset line R and poll all devices on the SCSI data bus. Any configurable devices are taken out of the polling procedure by assertion of the reset line R, permitting the master 23 to account for all devices which are not address assignable to be mapped, and their identity stored in memory 57.

As the configuration routine proceeds, the configuration controller 51 can begin issuing addresses consecutively, or by any other predetermined order, to devices connected in one of the directions. The memory 57 will prevent any mapped device not having an assignable address from having its address assigned to a second device.

The assignable device 25 is also shown to have a processor 60 which includes a standard SCSI controller for communicating over the SCSI data bus, as well as a configuration protocol controller. The processor 60 will initially open switches 62, during detection of a reset line being asserted, such that the pair of terminals 42, 43 and 48 and 46 are isolated. In the event the device 25 is not powered up, switches 62 will remain closed, thus permitting configuration to be effected on downstream devices which are presumably power enabled. The configuration switch 62 can be in a normally closed condition such that any malfunction of device 25 will not interfere with the configuration of later devices.

The driver/receiver 58 and 59 will be scanned by the processor 60 to determine the presence of any particular logic states. Once a logic state is detected on one of the pairs of terminals 42, 43 or 46, 48, those terminals are designated input terminals, while the remaining terminals are output terminals for the device. The configuration protocol for processor 60 will decode an asserted assignment command from Table I, and read the address which is subsequently applied to the SCSI data bus by the master device 23. Once the address has been successfully decoded, and stored in a configuration protocol register for processor 60, the driver receiver 58 can supply the CONFIRM/ACCEPT code of Table I to terminals 42 and 43. Thus, master 23 can similarly read the presence of this code and know that a successful assignment has been made.

The configuration protocol of processor 60 will thereafter close switches 62, permitting further commands issued by master 23 to be propagated to additional devices located in the direction B.

This sequence is repeated until all devices in a single direction are configured, and that no further CONFIRM/ACCEPT commands are received by the master device 23. Following configuration of all the devices, it is possible to issue a new command to each device which would require them to revert to their physical addresses rather than their configured addresses. This could be in the form of transmitting the assigned ID on the SCSI data bus, while applying a REVERT TO UNCONFIGURED STATE command, not shown in Table I. Thus, the device, seeing its own address on the SCSI data bus, would revert to its physical address as configured by the switches or jumper wires on the device.

Thus, there is shown how device interfaces which are used to connect an SCSI data bus 10 to a peripheral device may incorporate an assignment address function. These devices will permit the use of a preferred hierarchy of addresses to be assigned to all devices by the processor. In the event the assignment is not effected, the devices may still participate using their physical implemented addresses on the SCSI data bus.

Those skilled in the art will recognize yet other embodiments as described by the claims which follow.

Having thus described our invention, what we claim as new and desire to secure by Letters Patent is:

1. A system for assigning addresses to a plurality of peripheral devices interconnected on a small computer system interface (SCSI) bus comprising:
   a plurality of address configurable devices connected to said SCSI bus, each device being capable of communicating over said SCSI bus using standard SCSI protocol, said address configurable devices including:
   a configuration input terminal and a configuration output terminal serially connected with an adjacent address configurable device configuration input terminal and output configuration terminal for propagating address assignment commands to a connected address configurable device;
   a reset means for receiving a signal which removes a previously assigned address to said address configurable device;
   a configuration protocol means for receiving a configuration command from said configuration input terminals, and which initiates on said configuration input terminal a CONFIRM ACCEPT, or CONFIRM REJECT signal depending on whether a new address has been received from said SCSI bus during a configuration command, as well as initiates a subsequent transmission on said SCSI bus of said device new address;
   switching means connecting said configuration input terminal to said configuration output terminal following a successful address assignment to said address configurable device, whereby subsequent address assignments may be made to the adjacent device; and,
   a primary master device having a memory for storing addresses which are not available for assignment, said primary master device initiating a signal to said reset means and subsequently initiating polling commands on said SCSI bus to identify any devices having a fixed non-assignable address, and adding said non-assignable addresses to said memory, said primary master device sequentially transmitting to each of said address configurable devices a configuration command while applying a unique address which does not correspond to a non-assignable address in said memory on said SCSI bus for each of said address configurable devices, and for asserting a BUSY condition on said SCSI bus during assignment of said addresses.

2. The system of claim 1 further comprising a secondary master device connected to said SCSI bus, said master devices having different priorities for determining which of said master devices is a backup device.

3. The system of claim 2 wherein said primary and secondary devices arbitrate for access to said SCSI bus to perform address assignments for said address configurable devices.

4. The system of claim 1 wherein said master device includes first and second sets of configuration input and output terminals, each set of configuration input and output terminals connected to first and second groups of said address configurable devices, forming first and second chained connections with first and second groups of address configurable devices.

5. The device of claim 4 wherein said address configurable devices have first and second terminals forming said configuration input terminal and output terminal, each of said terminals including means sensing the presence of command data and configuring a terminal receiving configuration command data as an input terminal, and the remaining terminal as an output terminal.

6. A method for assigning addresses to a plurality of address configurable devices connected to an SCSI bus comprising:
   initiating from said master device a polling command to all devices on said SCSI bus which are not address assignable, storing in said master device addresses of said polled devices as addresses which are unassignable;
   initiating from a master device a busy condition on said SCSI bus;
   transmitting from said master device configuration commands to an input terminal of a first address configurable device connected to said SCSI bus, as well as an assignable address different from said stored addresses over said SCSI bus;

receiving at said first of said address configurable devices on said input terminal of said first address configurable device a first of said configuration commands and receiving on said SCSI bus an assignable address for said first configurable device, and storing said received address as said first configurable device address in a register;

forwarding a second configuration command received at said first configurable device to an adjacent configurable device;

receiving at said adjacent configurable device said forwarded command data, and storing an associated address on said SCSI bus as the address for said adjacent configurable device; and, forwarding third and subsequently received configuration commands to additional configurable devices, whereby addresses associated with each of said commands are transmitted on said SCSI bus and entered in each configurable device.

7. The method for assigning addresses to configurable devices according to claim 6 further comprising initiating at each configurable device a CONFIGURATION ACCEPT signal on said input terminal signalling said master device that said address assignment was accepted.

8. The method of claim 7 further comprising transmitting from said configurable device on said SCSI bus the address accepted by said configurable device when said CONFIGURATION ACCEPT signal is initiated.

9. The method of claim 6 further comprising initiating a reset to all of said configurable devices prior to initiating address assignments.

* * * * *